(12) United States Patent
Costa

(10) Patent No.: US 12,111,978 B2
(45) Date of Patent: Oct. 8, 2024

(54) VISION-IMPAIRED USER TYPING MODE FOR COMPUTING SYSTEMS

(71) Applicant: Dell Products L.P., Round Rock, TX (US)

(72) Inventor: Mauricio Martins Da Costa, Porto Alegre (BR)

(73) Assignee: Dell Products L.P., Round Rock, TX (US)

( * ) Notice: Subject to any disclaimer, the term of this patent is extended or adjusted under 35 U.S.C. 154(b) by 121 days.

(21) Appl. No.: 17/888,807

(22) Filed: Aug. 16, 2022

(65) Prior Publication Data
US 2024/0061517 A1  Feb. 22, 2024

(51) Int. Cl.
*G06F 3/023* (2006.01)
*G06F 3/02* (2006.01)

(52) U.S. Cl.
CPC .......... *G06F 3/0235* (2013.01); *G06F 3/0219* (2013.01); *G06F 3/0238* (2013.01)

(58) Field of Classification Search
CPC ..... G06F 3/0235; G06F 3/0219; G06F 3/0238
USPC .................................................. 345/156–169
See application file for complete search history.

(56) References Cited

U.S. PATENT DOCUMENTS

2004/0001734 A1* 1/2004 Burrell, IV .......... G09B 21/003
  400/472
2006/0277205 A1* 12/2006 Song ........................ G06N 5/02
  707/999.102
2010/0182242 A1* 7/2010 Fields .................... G06F 3/016
  345/169
2013/0275907 A1* 10/2013 Lau ..................... G06F 3/04886
  715/773
2015/0310762 A1* 10/2015 Seim ..................... G09B 15/00
  434/113
2019/0041995 A1* 2/2019 Kotta ................... H03K 17/972

OTHER PUBLICATIONS

Microsoft, "Keyboard Ghosting Interactive Demonstration," https://www.microsoft.com/applied-sciences/projects/anti-ghosting-demo, Accessed Aug. 10, 2022, 2 pages.
S. Mascetti et al., "TypeInBraille: A Braille-based Typing Application for Touchscreen Devices," Assets '11: The Proceedings of the 13th International ACM SIGACCESS Conference on Computers and Accessibility, Oct. 2011, pp. 295-296.

(Continued)

*Primary Examiner* — Kwin Xie
(74) *Attorney, Agent, or Firm* — Ryan, Mason & Lewis, LLP

(57) ABSTRACT

An apparatus comprises a processing device configured to activate a vision-impaired user typing mode responsive to detecting a designated combination of key presses of one or more of a plurality of keys of a keyboard. The processing device is also configured to obtain, responsive to activating the vision-impaired user typing mode, a mapping of a subset of the plurality of keys of the keyboard to respective positions of a matrix cell used in a tactile writing system. The processing device is also configured to decode, in response to detecting a combination of key presses and releases of one or more of the subset of the plurality of keys of the keyboard which are mapped to the respective positions of the matrix cell used in the tactile writing system, input of one or more characters.

20 Claims, 13 Drawing Sheets

(56) References Cited

OTHER PUBLICATIONS

J. Siqueira et al., "Braille Text Entry on Smartphones: A Systematic Review of the Literature," 2016 IEEE 40th Annual Computer Software and Applications Conference, Jun. 2016, pp. 521-526.
G. Peru, "What is N-Key Rollover (NKRO)?" https://www.howtogeek.com/789557/what-is-n-key-rollover-nkro/, Apr. 8, 2022, 5 pages.

* cited by examiner

VISION-IMPAIRED USER TYPING MODE FOR COMPUTING SYSTEMS

FIELD

The field relates generally to information processing, and more particularly to device management in information processing systems.

BACKGROUND

Blind and other vision-impaired users may utilize a tactile writing system such as Braille. Braille is a universally accepted system of writing that may be used by and for blind and other vision-impaired users, which uses a code of characters each made up of a set of raised dots arranged in a matrix cell. Braille typing in computing systems may be enabled through the use of dedicated hardware Braille keyboards.

SUMMARY

Illustrative embodiments of the present disclosure provide techniques for enabling a vision-impaired user typing mode for computing systems.

In one embodiment, an apparatus comprises at least one processing device comprising a processor coupled to a memory. The at least one processing device is configured to perform the steps of activating a vision-impaired user typing mode responsive to detecting a designated combination of key presses of one or more of a plurality of keys of a keyboard and obtaining, responsive to activating the vision-impaired user typing mode, a mapping of a subset of the plurality of keys of the keyboard to respective positions of a matrix cell used in a tactile writing system. The at least one processing device is also configured to perform the step of decoding, in response to detecting a combination of key presses and releases of one or more of the subset of the plurality of keys of the keyboard which are mapped to the respective positions of the matrix cell used in the tactile writing system, input of one or more characters.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

A keyboard is an input device with an arrangement of buttons or keys. The keys of a keyboard, when pressed, provide an input to a computing device that the keyboard is part of or connected to. The input for a particular key may be a written symbol (e.g., a letter, a number, a symbol, etc.), a system command (e.g., a space bar key which when pressed inserts a space character, a delete key which when pressed deletes a written symbol, etc.), etc. In some cases, keys of a keyboard include characters engraved or printed thereon which correspond to the written symbol or the system command that pressing such keys will input. It should be appreciated, however, that some or all keys of a keyboard may not have a character engraved or printed therein. In some cases, a keyboard is a physical device (e.g., a keyboard which has a wired or wireless connection to a desktop computer, an integrated keyboard of a laptop computer, etc.). In other cases, a keyboard may be a virtual device (e.g., a touchscreen keyboard interface on a smartphone or tablet computing device).

Figure 1A:
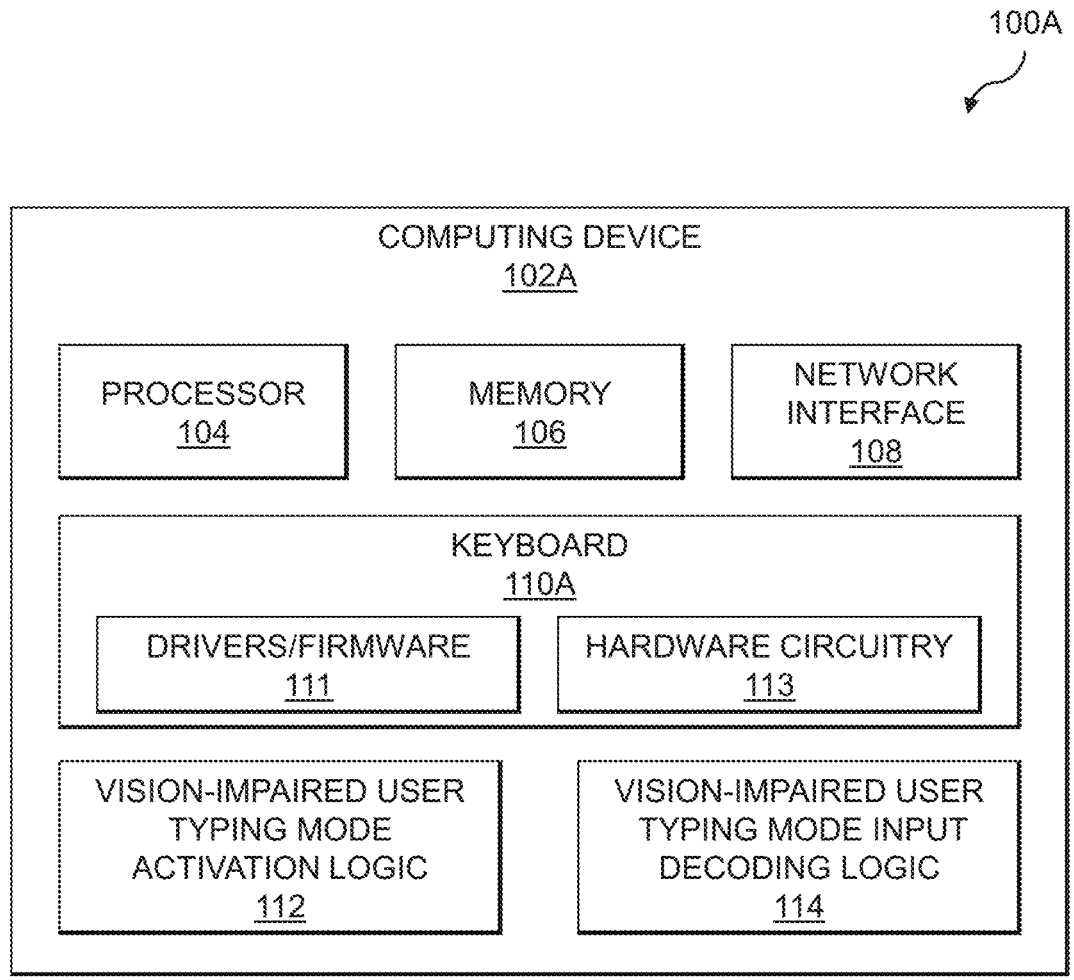
FIGS. 1A-IC are block diagrams of information processing systems configured for enabling a vision-impaired user typing mode on computing devices in an illustrative embodiment.

FIGS. 1A-IC show information processing systems 100A, 100B and 100C configured in accordance with illustrative embodiments. The information processing systems 100A, 100B and 100C are assumed to be built on at least one processing platform and provide functionality for enabling a vision-impaired user typing mode (e.g., Braille mode typing) on a keyboard that is not dedicated for use by vision-impaired users (e.g., a non-dedicated Braille keyboard). Such functionality is enabled in some embodiments through the use of vision-impaired user typing mode activation logic 112 and vision-impaired user typing mode input decoding logic 114. It should be noted that a vision-impaired user typing mode, while particularly useful for blind or vision-impaired users, is not restricted for use only by blind or vision-impaired users. Any user may utilize the vision-impaired user typing mode if desired.

In FIG. 1A, the information processing system 100A includes a computing device 102A, which comprises processor 104, memory 106, and network interface circuitry 108.

The processor 104 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 106 may comprise random access memory (RAM), read-only memory (ROM), flash memory or other types of memory, in any combination. The memory 106 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

The network interface circuitry 108 may comprise one or more transceivers used to interface the computing device 102A with one or more networks. The one or more networks may include a global computer network such as the Internet, a wide area network (WAN), a local area network (LAN), a satellite network, a telephone or cable network, a cellular network, a wireless network such as a WiFi or WiMAX network, or various portions or combinations of these and other types of networks, including Bluetooth networks.

The computing device 102A also includes a keyboard 110A, with the keyboard 110A comprising drivers/firmware 111 and hardware circuitry 113. The hardware circuitry 113 may comprise physical interconnections of keys of the keyboard 110A, along with hardware for detecting key presses and releases of the keys of the keyboard 110A. The drivers/firmware 111 of the keyboard 110A provide software or logic for interpreting signals from the hardware circuitry 113 (e.g., to detect signals representing key presses and releases, and for interpreting or decoding such signals into input characters which may be communicated over one or more busses, not shown, to the processor 104).

In the FIG. 1A embodiment, the keyboard 110A is assumed to be implemented internally to the computing device 102A. As one example, the computing device 102A may be a laptop with an integrated keyboard 110A. In some cases, the keyboard 110A is a "virtual" or software keyboard (e.g., which is displayed on a touchscreen device such as a smartphone, tablet, etc.). In such cases, haptic feedback or other features of the hardware circuitry 113 may be used to enable a user to locate fingers on the virtual keyboard displayed on the touchscreen device, with the drivers/firmware 111 being configured for detecting key presses and releases on different portions of the touchscreen via signals received from the hardware circuitry 113.

Figure 1B:
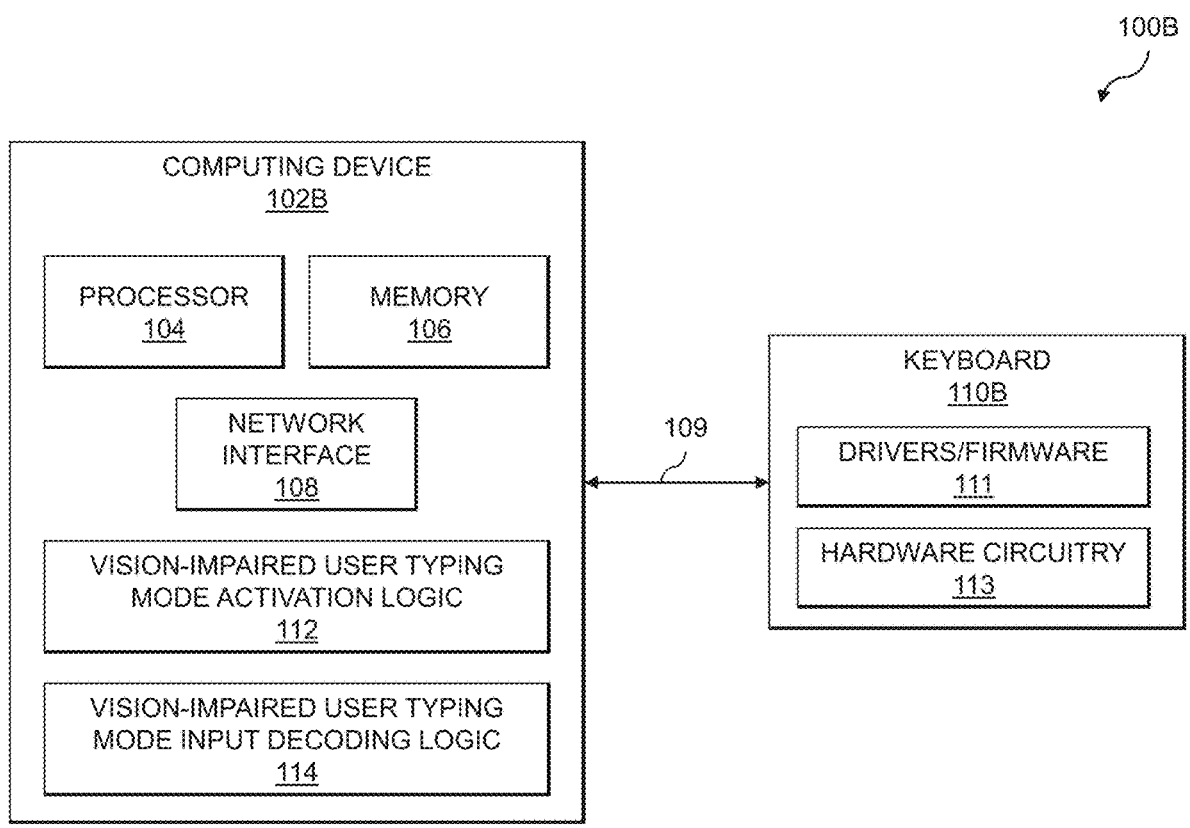

In FIG. 1B, the information processing system 100B includes a computing device 102B, which similarly comprises processor 104, memory 106 and network interface circuitry 108. Here, however, the computing device 102B is coupled to an external keyboard 110B via a wired or wireless connection 109. Wired connection may be achieved, for example, via a PS/2 (Personal System/2) port on the computing device 102B, a Universal Serial Bus (USB) port on the computing device 102B, etc. Wireless connection may include, for example, Bluetooth, Wifi, etc., facilitated by the network interface circuitry 108 of the computing device 102B. The keyboard 110B, similar to keyboard 110A, includes drivers/firmware 111 and hardware circuitry 113.

In the information processing systems 100A and 100B, vision-impaired user typing mode activation logic 112 and vision-impaired user typing mode input decoding logic 114 are implemented by the computing devices 102A and 102B. In the information processing system 100C of FIG. 1C, the vision-impaired user typing mode activation logic 112 and the vision-impaired user typing mode input decoding logic 114 are implemented on keyboard 110C, where the keyboard 110C is an external keyboard that is coupled to a computing device 102C via a wired or wireless connection 109 in a manner similar to the information processing system 100B. More particularly, the vision-impaired user typing mode activation logic 112 and the vision-impaired user typing mode input decoding logic 114 are implemented using drivers/firmware 111 of the keyboard 110C which, in addition to detecting signals from the hardware circuitry 113 representing key presses and releases, provides the logic for suitably decoding such key presses and releases as Braille characters when Braille mode typing is activated.

The computing devices 102A, 102B, 102C (collectively, computing devices 102) may comprise, for example, physical computing devices such as Internet of Things (IoT) devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The computing devices 102 may also or alternately comprise virtualized computing resources, such as VMs, containers, etc.

The vision-impaired user typing mode activation logic 112 is configured to activate and deactivate a typing mode for vision-impaired users (e.g., Braille mode typing) in response to detecting a designated combination of key presses on the keyboards 110A, 110B 110C (collectively, keyboards 110). The designated combination of key presses may include, by way of example, a combined press and release of a function ("FN") key and one or both of an "F" and "J" key of the keyboards 110. In some embodiments, distinct combinations of key presses are used for activating and deactivating the typing mode for vision-impaired users. For example, the combined press and release of "FN" and "F" keys of the keyboards 110 may activate the typing mode for vision-impaired users while the combined press and release of "FN" and "J" keys of the keyboards 110 may deactivate the typing mode for vision-impaired users.

When the vision-impaired user typing mode activation logic 112 is configured to selectively enable and disable keys of the keyboards 110. A Braille keyboard or other tactile writing system, for example, uses fewer keys than a standard keyboard, and thus keys which are not needed for inputting Braille characters may be disabled on the keyboards 110. The vision-impaired user typing mode activation logic 112 is also configured to map certain keys of the keyboards 110 for use in inputting characters in a tactile writing system such as Braille. By way of example, in some embodiments the "Z" row of keys (e.g., in a standard QWERTY keyboard layout) may be mapped to dots used in a dot matrix for representing characters in the tactile writing system. Various special keys (e.g., control, shift, caps lock, tab, alt, command, option, space bar, function, enter or return, backspace, etc.) may also be mapped or re-mapped as desired. For example, such special keys which are relatively far from a first set of the keys mapped to the dots used in the dot matrix for representing characters in the tactile writing system may be re-mapped to keys which are relatively closer to the first set of keys.

The vision-impaired user typing mode input decoding logic 114 is configured to detect key presses and releases while the keyboards 110 have the typing mode for vision-impaired users activated, and to convert such detected key presses and releases to scan codes (e.g., representing letters of the alphabet, numbers, special keys or key combinations, etc.). The vision-impaired user typing mode input decoding logic 114 may also be configured to recognize key lock sequences to enable special key combinations (e.g., for shifting case, for inputting commands such as "CTRL-A", "CTRL-C", "CTRL-V", "CTRL-ALT-DEL", etc.).

At least portions of the vision-impaired user typing mode activation logic 112 and the vision-impaired user typing mode input decoding logic 114 may be implemented at least in part in the form of software that is stored in memory (e.g., memory 106, drivers/firmware 111) and executed by a processor (e.g., processor 104, hardware circuitry 113).

Figure 1C:
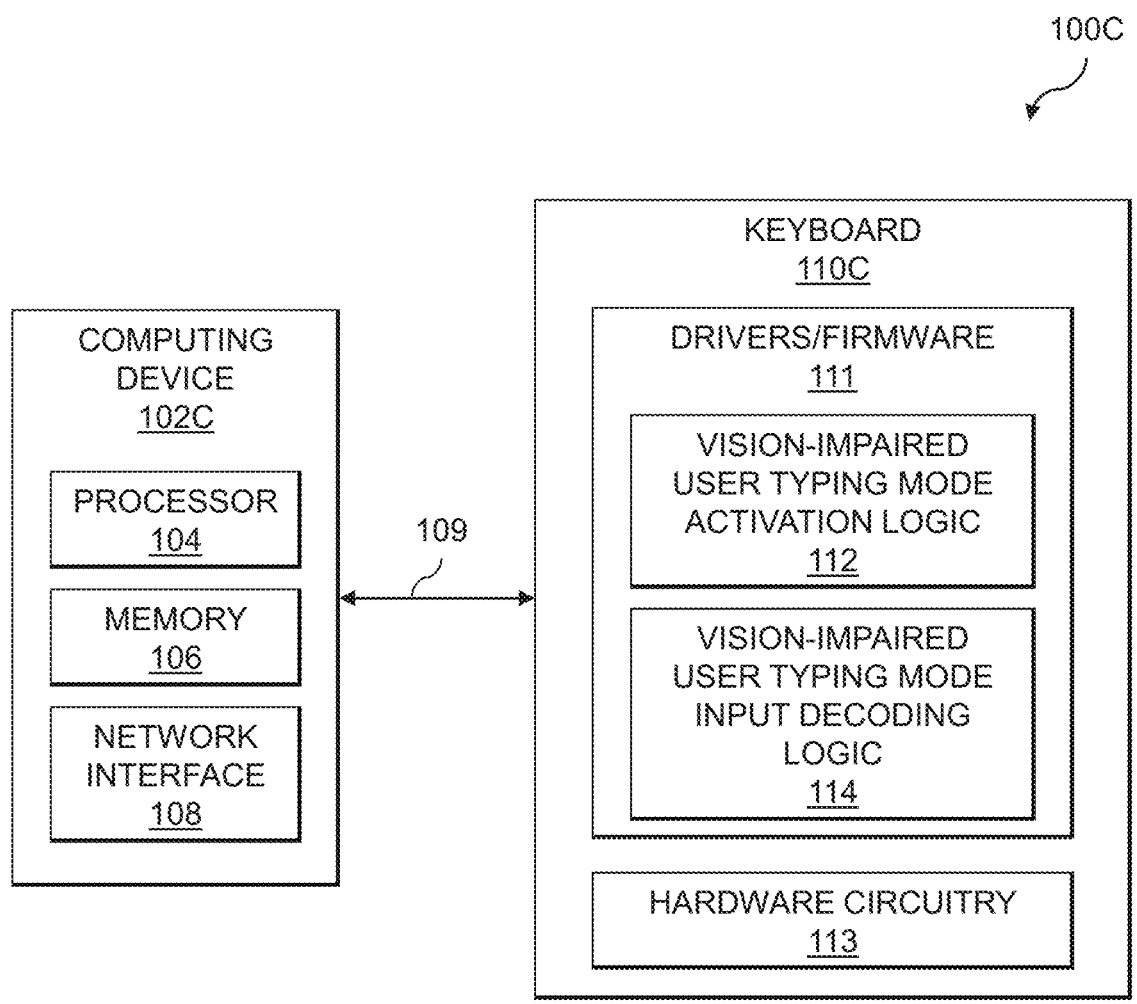

It is to be understood that the particular set of elements shown in FIGS. 1A-1C for enabling a vision-impaired user typing mode on computing devices 102 are presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

An exemplary process for enabling a vision-impaired user typing mode on computing devices will now be described in more detail with reference to the flow diagram of FIG. 2. It is to be understood that this particular process is only an example, and that additional or alternative processes for enabling a vision-impaired user typing mode on computing devices may be used in other embodiments.

In this embodiment, the process includes steps 200 through 204. These steps are assumed to be performed by the computing devices 102 and keyboards 110 utilizing the vision-impaired user typing mode activation logic 112 and the vision-impaired user typing mode input decoding logic 114. The process begins with step 200, activating a vision-impaired user typing mode responsive to detecting a designated combination of key presses of one or more of a plurality of keys of a keyboard (e.g., keyboard 110). The plurality of keys of the keyboard may be arranged in a QWERTY keyboard layout, and the designated combination of key presses of the plurality of keys of the keyboard may comprise a combination of a "FN" (function) key in the QWERTY keyboard layout and at least one of an "F" key in the QWERTY keyboard layout and a "J" key in the QWERTY keyboard layout.

In step 202, responsive to activating the typing mode for vision-impaired users, a mapping of a subset of the plurality of keys of the keyboard to respective positions of a matrix cell used in a tactile writing system is obtained. The tactile writing system may comprise a Braille writing system. One or more of the subset of the plurality of keys may be configured with tactile features for a user to locate said one or more of the subset of the plurality of keys.

The subset of the plurality of keys of the keyboard mapped to respective positions of the matrix cell used in the tactile writing system may comprise keys in a "Z" row of keys in a QWERTY keyboard layout. The matrix cell used in the tactile writing system may comprise a 3×2 matrix cell, a first subset of the positions of the matrix cell may be mapped to "V", "C" and "X" keys in a "Z" row of keys in a QWERTY keyboard layout, and a second subset of the positions of the matrix cell may be mapped to "M", comma ("<,") and period (">.") keys in the "Z" row of keys in the QWERTY keyboard layout.

The matrix cell used in the tactile writing system may alternatively comprise a 4×2 matrix cell, a first subset of the positions of the matrix cell may be mapped to "V", "C", "X" and "Z" keys in a "Z" row of keys in a QWERTY keyboard layout, and a second subset of the positions of the matrix cell may be mapped to "M", comma ("<,"), period (">.") and question mark ("?/") keys in the "Z" row of keys in the QWERTY keyboard layout.

In some embodiments, step 202 includes disabling one or more of the plurality of keys of the keyboard not in the subset of the plurality of keys.

The plurality of keys of the keyboard may be arranged in a designated layout (e.g., a QWERTY keyboard layout), and step 202 may further comprise re-mapping one or more non-alphanumeric ones of the plurality of keys of the keyboard from original positions in the designated layout to new positions closer to the subset of the plurality of keys of the keyboard.

Input of one or more characters is decoded in step 204 in response to detecting a combination of key presses and releases of one or more of the subset of the plurality of keys of the keyboard which are mapped to the respective positions of the matrix cell used in the tactile writing system.

Step 204 may include detecting a key lock of a given non-alphanumeric one of the plurality of keys of the keyboard in response to detecting a sequence of two key presses of the given non-alphanumeric key prior to detecting key presses of one or more of the subset of the plurality of keys of the keyboard which are mapped to the positions of the matrix cell used in the tactile writing system. Step 204 may further include ending the key lock of the given non-alphanumeric one of the plurality of keys in response to at least one of: detecting an additional key press of the given non-alphanumeric key prior to detecting key presses of one or more of the subset of the plurality of keys of the keyboard which are mapped to the positions of the matrix cell used in the tactile writing system; and decoding a key combination including the given non-alphanumeric key and one or more additional ones of the plurality of keys of the keyboard.

In some embodiments, step 204 includes decoding a given character represented in the tactile writing system by raised features in two or more of the positions of the matrix cell responsive to detecting at least partially overlapping key presses of two or more of the subset of the plurality of keys of the keyboard which are mapped to the two or more positions of the matrix cell.

Figure 2:
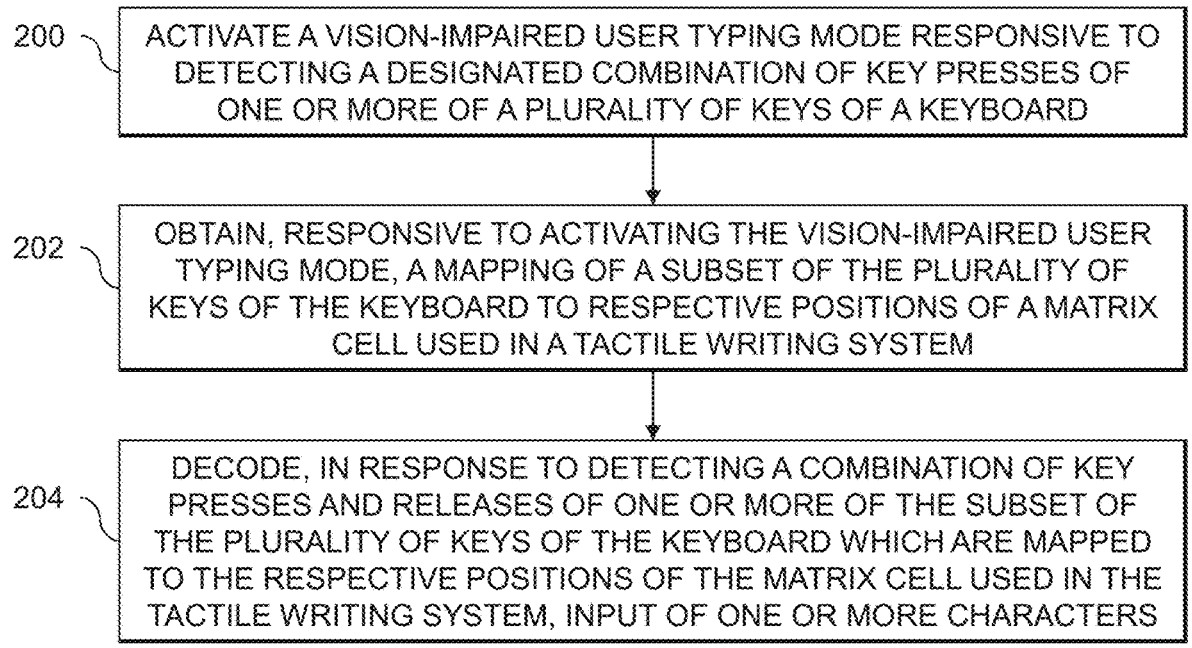
FIG. 2 is a flow diagram of an exemplary process for enabling a vision-impaired user typing mode on computing devices in an illustrative embodiment.

The FIG. 2 process may further include deactivating the typing mode for vision-impaired users responsive to detecting the designated combination of key presses of the plurality of keys of the keyboard.

Illustrative embodiments provide technical solutions for supporting Braille typing in an otherwise "conventional" or "traditional" keyboard in an efficient manner. A conventional or traditional keyboard refers to a keyboard which is not a dedicated Braille keyboard, which are expensive and not well supported by many hardware vendors. Braille is a universally accepted system of writing which may be used by and for blind or other vision-impaired users. Braille includes a code of characters made up of dots arranged in a matrix or cell. Braille characters can be made by 6 or 8 dots, and dedicated Braille keyboards often provide a smaller set of keys than conventional or traditional keyboards. Thus, a Braille keyboard can be implemented using a subset of keys of a conventional or traditional keyboard (e.g., which have a larger number of keys than dedicated Braille keyboards), with various modifications as described herein. Such an approach for adapting an otherwise conventional keyboard to support Braille typing can make hardware cheaper, and also provide a keyboard vendor with an ability to differentiate from competitors and offer a complete solution.

Figure 3:
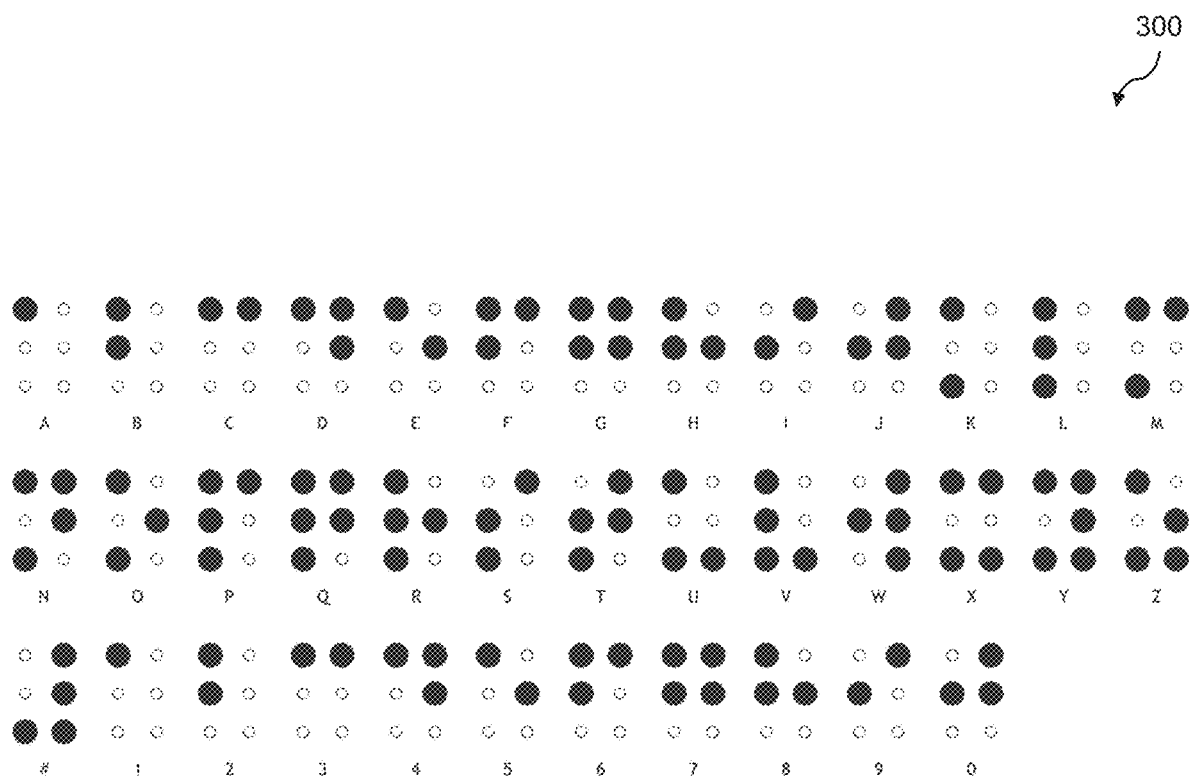
FIG. 3 shows an encoding of characters in a Braille alphabet in an illustrative embodiment.
Figure 4:
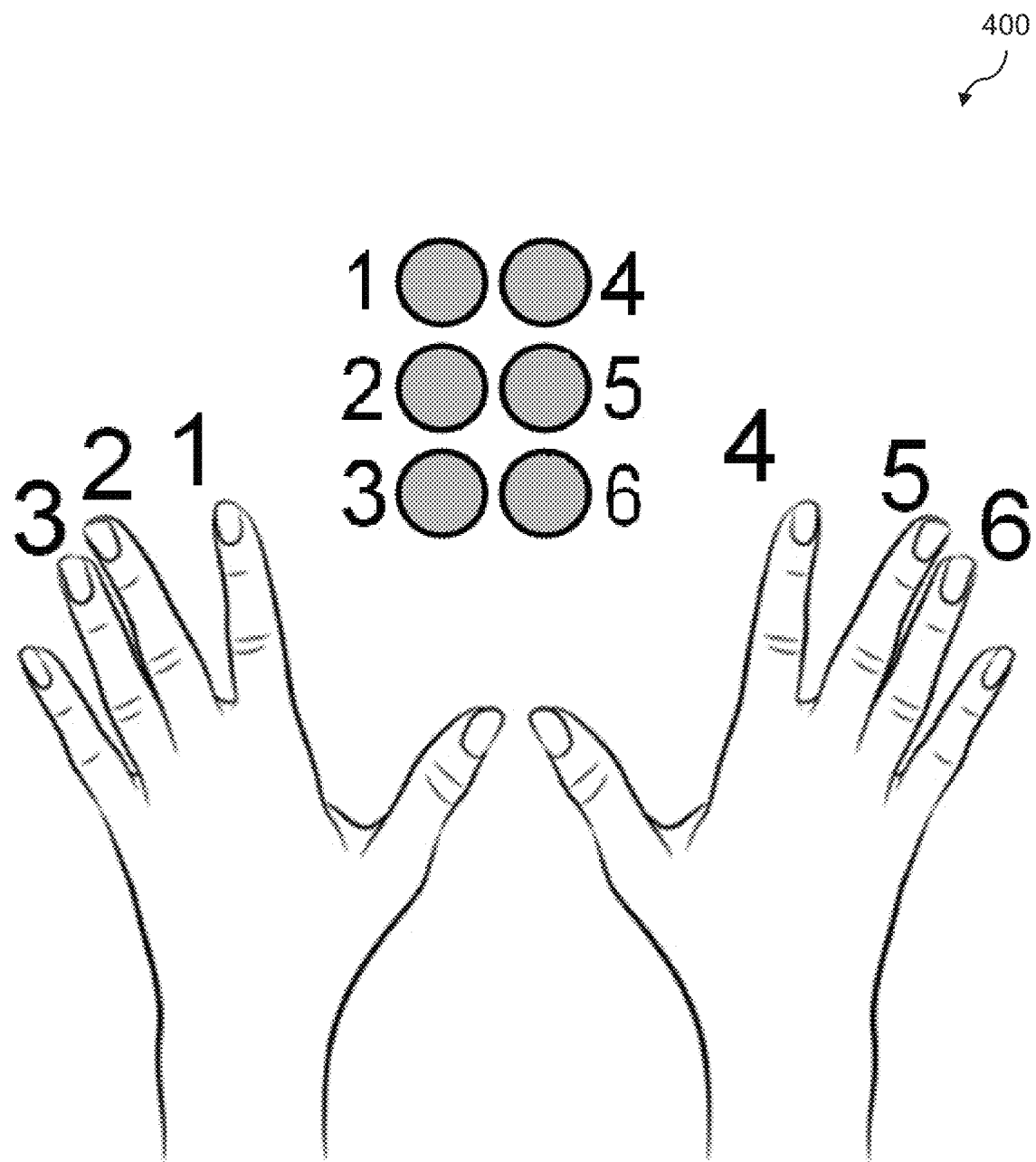
FIG. 4 shows a mapping of positions in a matrix cell used in Braille typing to fingers of a user in an illustrative embodiment.

In some implementations, Braille supports a code of 63 characters, each made up of one to six dots in a six-position matrix or cell. The cell is a single 3×2 matrix, where each position of the matrix represents a dot which is embossed in paper in a pattern to be recognized by the reader. FIG. 3 shows an example of a Braille alphabet encoding 300 using 3×2 matrix cells. Braille typing is a technique which mimics the way Braille characters are formed (e.g., as raised dots on paper). FIG. 4 shows an example mapping 400 of the six positions of a 3×2 matrix cell to fingers of a user (e.g., position 1 to the index finger of the left hand, position 2 to the middle finger of the left hand, position 3 to the ring finger of the left hand, position 4 to the index finger of the right hand, position 5 to the middle finger of the right hand, and position 6 to the ring finger of the right hand). Thus, to type the letter "A" in the Braille alphabet encoding 300 using the mapping 400, the finger labeled "1" is pressed. To type the letter "B" in the Braille alphabet encoding 300 using the mapping 400, the fingers labeled "1" and "2" are pressed together, and so on for other characters.

To maximize the capabilities of a Braille typing scheme, 8-dot Braille typing may be used where the matrix cells are 4×2, and where the seventh and eighth dots are mapped to the pinky fingers of the left and right hand, respectively. The seventh and eighth dots have the capability to extend notation, such as to indicate whether a particular combination of dots or key presses is a number, to indicate letter case, to indicate special characters (e.g., diacritics, signs, etc.).

From the perspective of a blind or vision-impaired user, adopting a Braille system of typing is straightforward as it respects the conventions of the Braille alphabet and simplifies the keyboard. Keyboard simplification, for example, includes deactivating or disabling some keys (e.g., keys other than those set of keys chosen to perform Braille typing, which is less than the total number of keys on a standard computer keyboard). Further, Braille typing can minimize finger and hand excursion over a standard computer keyboard, and minimizes or reduces the need to memorize key positions. This situation can lead to technical problems if the keyboard changes its layout or language support.

Modern computer systems may include text-to-speech functionality, which resolves the feedback for data output. The text-to-speech functionality, for example, can read text that is displayed on a screen (e.g., an editor, page, etc.) for the user, thus providing accessibility for blind or vision-impaired users. Illustrative embodiments provide technical solutions that provide accessibility for blind or vision-impaired users with a focus on data input, which can complement text-to-speech functionality providing an accessibility solution for data output. The technical solutions described herein achieve data input accessibility functionality for blind or vision-impaired users that take into account technical problems and limitations of computer keyboards.

To enable a traditional or conventional computer keyboard (e.g., a keyboard using a QWERTY, AZERTY, DVORAK, etc. layout) to support Braille typing, there are several technical problems to be resolved. One such technical problem is referred to as "n-key rollup" or "n-key rollover." N-key rollup or rollover refers to the functionality or capability of a keyboard to read distinctly several keys which are typed together (e.g., at the same time, or within some designated threshold period of time as one another). A keyboard with n-key rollup or rollover functionality has the ability to successfully scan or detect "n" keys which are pressed at once. For 6-dot Braille, a keyboard should support at least 6 keys pressed simultaneously. For 8-dot Braille, a keyboard should support at least 8 keys pressed simultaneously.

Many computer keyboards have electronic designs which limit the ability to successfully recognize when more than some designated threshold number of keys (e.g., "n" keys) are pressed together. For example, in many computer keyboards, pressing the "A", "S", "D" and "W" keys together will not produce an output of A, S, D and W. Instead, often only one, two or three of these keys are decoded and output, but never or rarely these four keys together. This problem is referred to as "ghosting." The A, S, D, W combination is one of the most common n-key rollup issues encountered, as these keys are frequently used in contexts such as gaming. It should be appreciated, however, that various other key combinations are subject to ghosting issues. Ghosting can present a significant issue for Braille typing, which may rely on simultaneous (or near simultaneous) pressing of up to six or eight keys together (e.g., depending on whether 3×2 or 4×2 matrix cells are used).

Another technical problem to be resolved is keyboard mode switching. Illustrative embodiments enhance otherwise conventional keyboards to support new Braille mode typing capabilities. Thus, keyboard firmware, drivers or other logic on computing devices which keyboards are connected to are designed and modified to be capable of understanding special key combinations for activating and deactivating Braille mode typing (e.g., and potentially for switching among different types of Braille mode typing, such as between the use of 3×2 and 4×2 matrix cells).

Yet another technical problem to be resolved is key identification for Braille mode typing. In many computer keyboards, certain keys (e.g., "F" and "J" keys) have raised features (e.g., dots, lines, etc.) which enable a user to easily position their fingers for touch typing. Similar features may be added or provisioned on designated keys to support easy positioning of fingers for Braille mode typing. Such features may be on the key itself (e.g., a new key design), through provisioning of stickers on designated existing keys (e.g., with Braille code or other raised features capable of distinguishing such designated existing keys from other existing keys), through turning backlights on for such keys (e.g., which may be suitable for users that are not completely blind or vision impaired). To facilitate Braille-enabled keys, Braille marks may be used for certain key names. For example, 2-3 letters may be used to represent key names (e.g., FN for the function key, SH for the shift key, CTR for the control key, ALT for the alt key, RET for the enter or return key, BS for the backspace key, TAB for the tab key, etc.). Other keys, such as arrow keys, may also include markings.

The technical solutions described herein provide functionality which addresses and mitigates these and other technical problems to enable Braille mode support in computer keyboards.

To address n-key rollup issues, some embodiments redesign keyboard circuitry to act as a real matrix of rows and columns with diodes in series and switches to prevent short circuits which makes decoding invalid. While such an approach provides a true keyboard without ghosting issues, this approach will increase the cost of production and requires new hardware.

Analysis of common keyboards indicate that certain combinations of keys do not exhibit ghosting problems. For example, keys in the "Z" row of a standard QWERTY keyboard layout often do not exhibit ghosting issues. For example, pressing the "Z", "X", "C" and "V" keys (e.g., with the left hand) will result in such keys being output (e.g., where, for the purposes of Braille mode typing, the ordering is not important). Similarly, pressing the "M", "<,", ">.", and "?/" keys with the right hand do not exhibit ghosting issues. Thus, the "Z" row of a standard QWERTY keyboard layout is suitable for Braille mode typing. The "Z" row is also nearest to most of the function/control keys, and thus results in shorter finger excursion demanding less muscular memory and reducing typing fatigue.

It should be noted that there are other combinations of keys which also do not exhibit ghosting issues, and thus provide possible solutions to the n-key rollup technical problem. The Z row of a standard QWERTY keyboard layout, however, is preferred in some embodiments as it can also provide a technical solution to the technical problem of finger and hand excursion over the keyboard. Further, various function/control keys (e.g., "CONTROL" or "CTRL", "COMMAND", "ALT", "SHIFT", "CAPS LOCK", "ENTER", "SPACE", "MENU" and "FN") are all together near one another around the "Z" row of a standard QWERTY keyboard layout.

Figure 5:
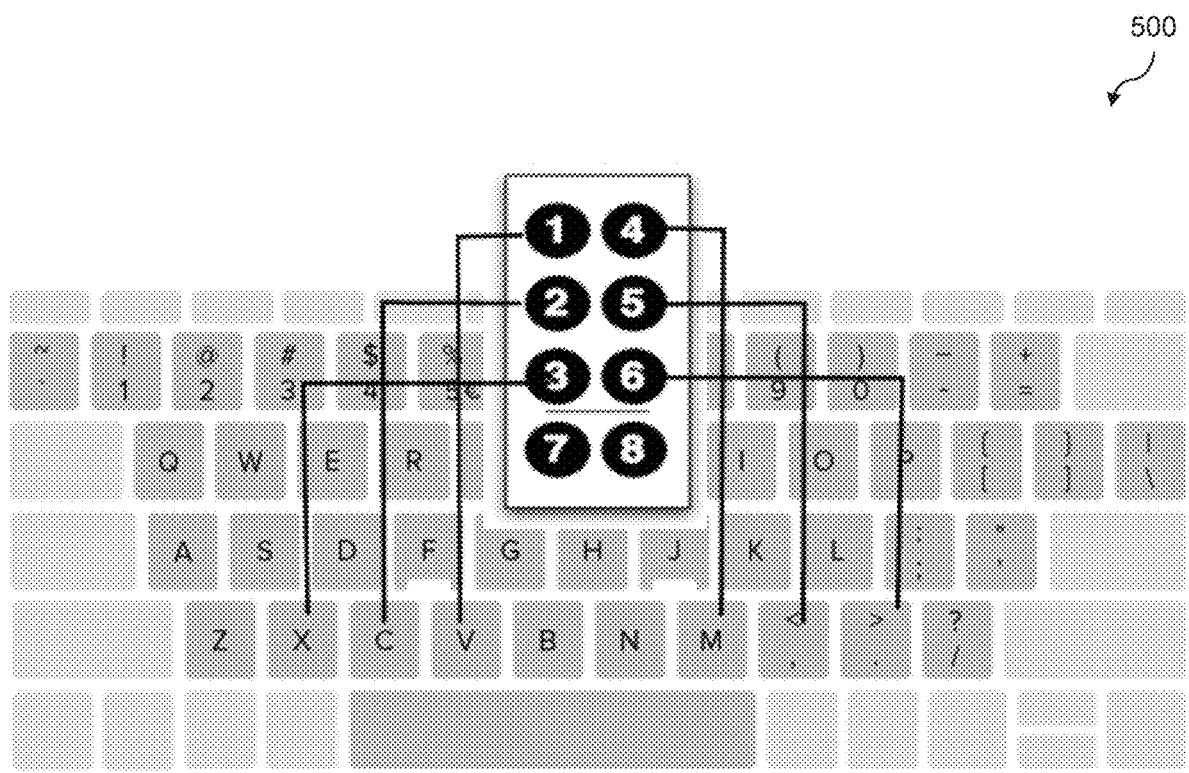
FIG. 5 shows a mapping of positions in a matrix cell used in Braille typing to keys of a keyboard layout in an illustrative embodiment.

FIG. 5 shows a mapping 500 of positions in a 4×2 Braille matrix cell to different keys in the "Z" row of a standard QWERTY keyboard layout. In the mapping 500, position 1 is mapped to the "V" key, position 2 is mapped to the "C" key, position 3 is mapped to the "X" key, position 4 is mapped to the "M" key, position 5 is mapped to the "<," key, and position 6 is mapped to the ">." key. Although not explicitly shown in FIG. 5, position 7 may be mapped to the "Z" key and position 8 may be mapped to the "?/" key.

Figure 6:
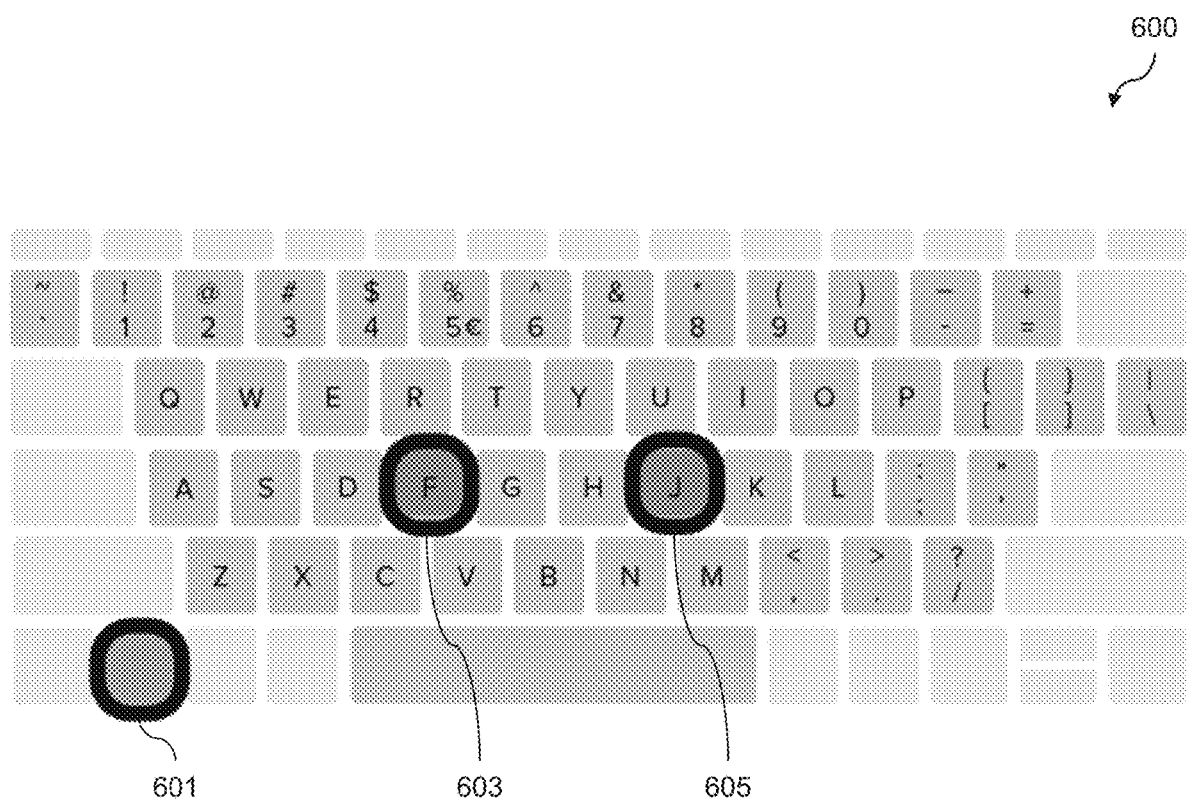
FIG. 6 shows keys of a keyboard layout which may be used for activation and deactivation of Braille mode typing in an illustrative embodiment.

Firmware and/or drivers of a keyboard may be configured in some embodiments to recognize and then activate/deactivate Braille mode typing in response to activation of a designated mode switcher key combination. In some embodiments (e.g., which use the mapping 500 illustrated in FIG. 5), the combination of the "FN" key (e.g., the dedicated function key) and the "F" or "J" key is used as a mode switcher for activating and deactivating Braille mode typing. FIG. 6 shows a standard QWERTY keyboard layout 600, with the "FN" key 601, "F" key 603 and "J" key 605 highlighted, illustrating the keys which may be used for activation/deactivation of Braille mode typing. In some embodiments, the combination of the "FN" and "F" key are used for activating Braille mode typing, while the combination of the "FN" and "J" key are used for deactivating Braille mode typing, or vice versa. The "F" and "J" keys are naturally marked for touch typing (e.g., in most standard keyboards) as an alignment for fingers. For example, the "F" and "J" keys may have a raised notch bar on a bottom edge thereof, which the user can feel with their indicator fingers. If the user has memorized the keyboard, the user can then locate other keys based on finding the indicator keys.

Figure 7:
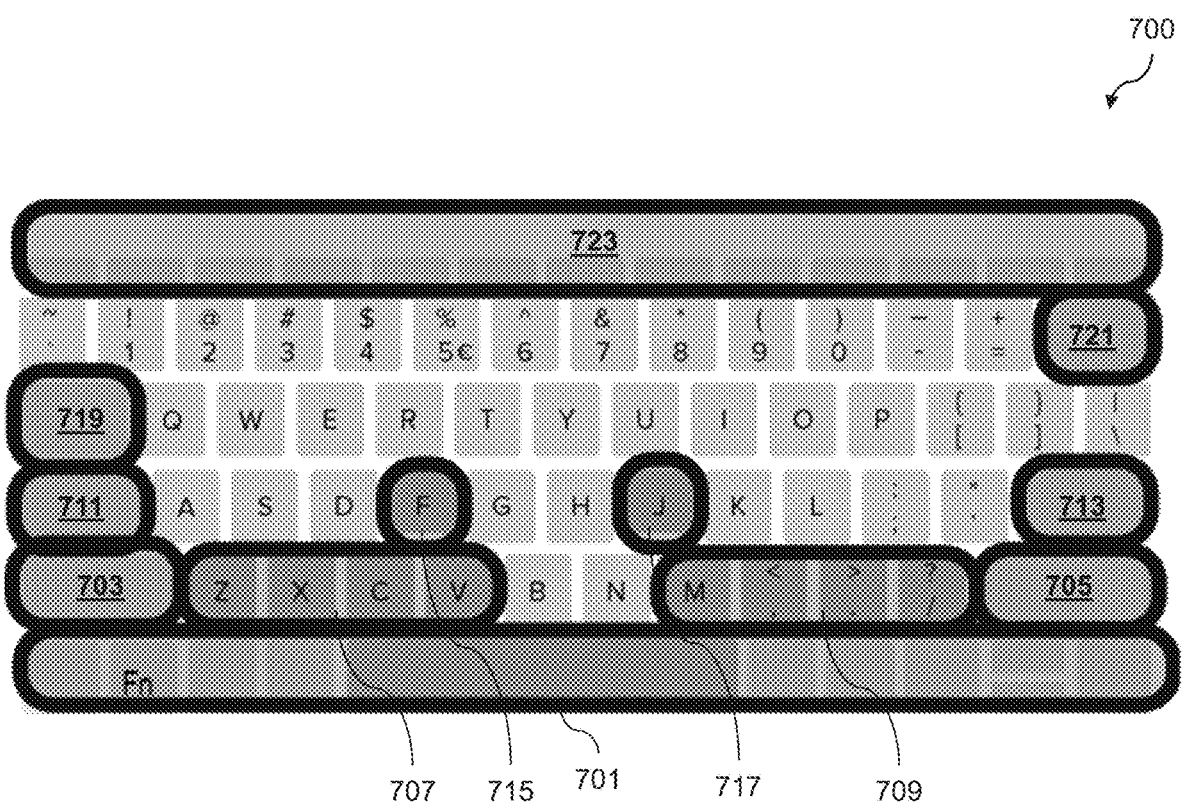
FIG. 7 shows keys of a keyboard layout which may be enabled while Braille mode typing is activated in an illustrative embodiment.

FIG. 7 shows a standard keyboard layout 700, highlighting the keys which are enabled when Braille mode typing is activated. The enabled keys include the row of keys 701 (e.g., including "CONTROL", "OPTION", "COMMAND", space bar and "FN" keys), "SHIFT" keys 703 and 705, the "Z", "X", "C" and "V" keys 707, the "M", "<,", ">." and "?/" keys 709, "CAPS LOCK" keys 711 and 713, the "F" key 715, the "J" key 717, a "TAB" key 719, a "BACKSPACE" key 721, and a top row of function keys 723 (e.g., "F1" through "F12" keys). Other keys in the keyboard layout 700 may be disabled or kept off (e.g., pressing such keys results in no action) while Braille mode typing is activated.

Figure 8:
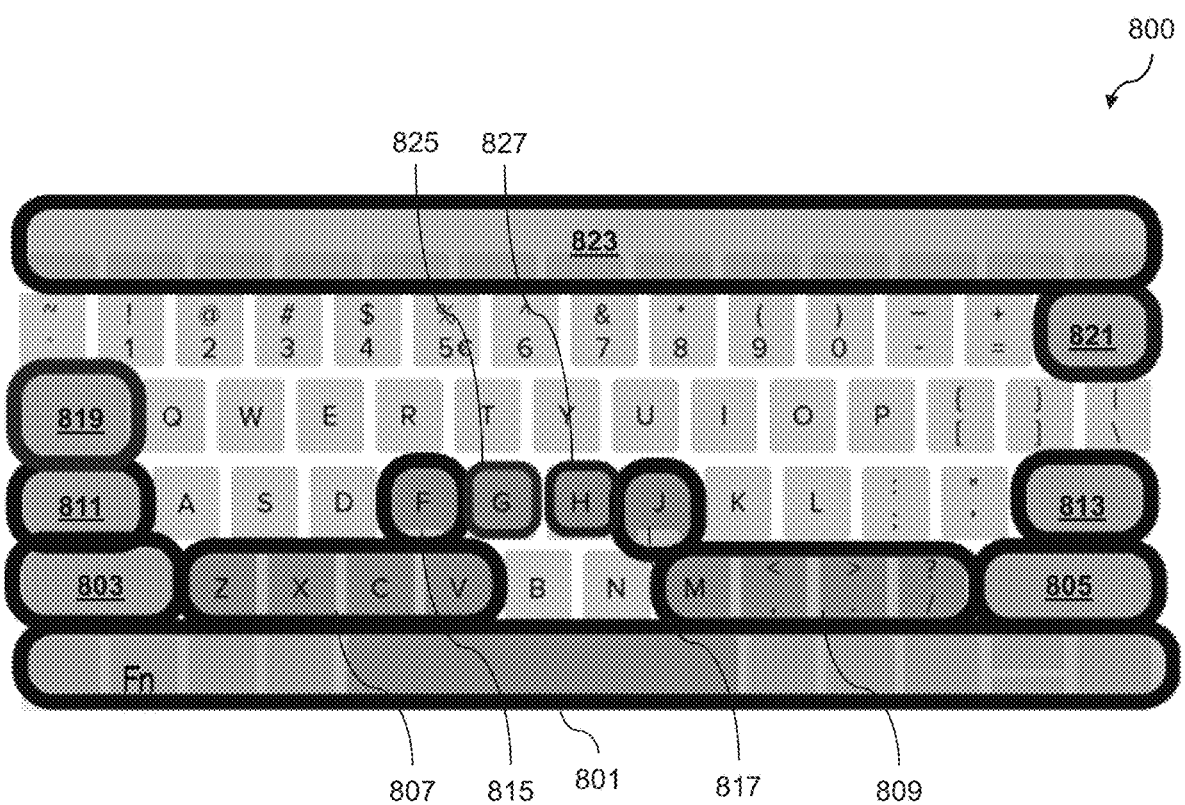
FIG. 8 shows a re-mapping of keys of a keyboard layout which may be enabled while Braille mode typing is activated in an illustrative embodiment.

In some embodiments, functionality of one or more of the keys highlighted in the keyboard layout 700 are re-mapped to other keys to facilitate some access (e.g., to reduce required finger or hand movement while typing). FIG. 8 shows a keyboard layout, which highlights the keys which are enabled when Braille mode typing is activated. The enabled keys include the row of keys 801 (e.g., including "CONTROL", "OPTION", "COMMAND", space bar and "FN" keys), "SHIFT" keys 803 and 805, the "Z", "X", "C" and "V" keys 807, the "M", "<,", ">." and "?/" keys 809, "CAPS LOCK" keys 811 and 813, the "F" key 815, the "J" key 817, a "TAB" key 819, a "BACKSPACE" key 821, and a top row of function keys 823 (e.g., "F1" through "F12" keys). The keyboard layout 800 further utilizes key remapping. For example, the "TAB" key 819 in the upper left part of the keyboard is remapped to the "G" key 825 and the "BACKSPACE" key 821 in the far right of the keyboard is remapped to the "H" key 827. With this remapping, when the "H" key 827 is pressed and Braille mode typing is activated, a "backspace" action is initiated (rather than an "H" input). The remapping of the "TAB" key 819 and the "BACKSPACE" key 821 in the keyboard layout 800 makes these relatively hard to reach keys nearer and more accessible to the "Z" row of the keyboard layout 800.

Advantageously, the technical solutions described herein provide a simplified and fully functional multi-key keyboard which can be used to input characters as specified in Braille writing systems. The multi-key keyboard, in some embodiments, is a reduced keyboard and utilizes some identification and layout changes relative to a standard keyboard layout (e.g., a QWERTY keyboard layout). Such changes may include, for example, marking the keys used to form characters in Braille mode typing (e.g., with one or more dots embossed in a corner of such keys). In some cases, keys accessible by a left hand of a user have a dot or other feature at a first position thereof (e.g., a right upper corner) while keys accessible by a right hand of the user have a dot or other feature at a second position thereof (e.g., a left upper corner). Such changes may also or alternatively include repositioning various keys (e.g., to move them closer to other keys used in Braille typing, such as to keys closer to the "Z" row of a QWERTY keyboard layout), to move the "FN" (function) key and "COMMAND" (Windows, command or macro key) keys (e.g., such that the "FN" key is leftmost key in the space bar row of keys).

The adoption of multi-key typing as described herein to build Braille characters makes it impossible to emit special characters modified by "SHIFT", "CTRL" or "ALT" keys. To input these keys while Braille mode typing is activated, the keyboard should be placed in a lock mode. In some embodiments, a key may be "locked" by pressing it twice to enable the respective modifier. For example, if the user wants to send "CTRL-A", the user can type the "CTRL" key twice, and then type the equivalent key combination for the letter A in Braille mode typing. If a control state is activated and needs to be canceled, the same key may be typed again. In the example above, to cancel the "CTRL" key lock, the "CTRL" key may be pressed again. Special cases should also be supported. For example, a "CTRL-ALT-DEL" key combination sequence may be initiated by pressing the "CTRL" key twice, pressing the "ALT" key twice, and finally pressing the "DEL" key.

A keyboard, when initialized, may be set to a native mode (e.g., normal functionality, with Braille mode typing deactivated). To activate Braille mode typing, a user presses a designated set or sequence of keys (e.g., "FN+F", "FN+J", etc.). The user may then begin typing in Braille mode. For example, to type DELL, the following sets of keys are pressed and released together in sequence:
(1) "V", "M" and "<,"
(2) "V" and "<,"
(3) "V", "C" and "X"
(4) "V", "C" and "X"

To generate a shift, control or alt state, the user just presses the "SHIFT", "CTRL" or "ALT" keys twice, followed by a set and sequence of keys for the shift or control state. "CTRL-M", for example, may be entered by a sequence of: "CTRL"→"CTRL"→"V", "M" and "X" keys pressed and released together. "ALT-P" may be entered by a sequence of: "ALT"→"ALT" →"V", "X", "C" and "M" keys pressed and released together. "ALT-SHIFT-F" (e.g., to format a text in vscode) may be entered by a sequence of: "ALT"→"ALT"→"SHIFT"→"SHIFT"→"C", "V" and "M" keys pressed and released together.

N-key rollover, when Braille mode typing is activated, results in a keyboard emitting letter scan codes in response to designated sets of keys being pressed and released together. For example, when the "M" and "C" keys are pressed together while Braille mode is activated, the keyboard will emit the letter scan code of VK_I (e.g., the code for when the letter "I" is typed).

To interpret multi-key pressing when Braille mode typing is activated, a keyboard should be configured to implement an algorithm that listens for key presses, and only processes a key press that has passed a designated threshold amount of time from a last keypress (e.g., to account for debouncing and a key timeout ratio). Depending on the number of keys pressed together, the algorithm will decode and emit the equivalent press of a normal keyboard mode. Such processing will be repeated again until all keys are released.

Figure 9:
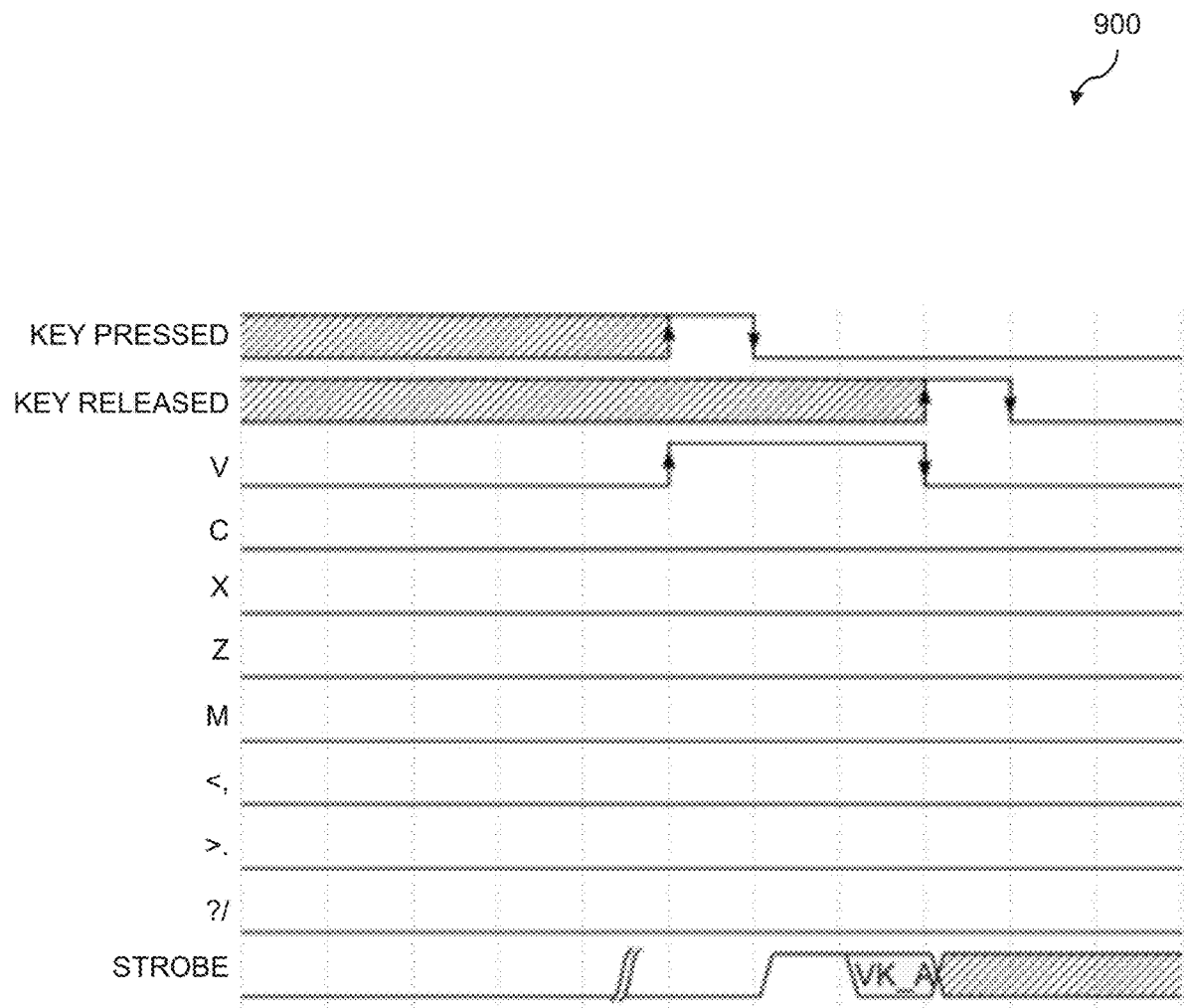
FIG. 9 shows a timing diagram for decoding key presses and releases used to input a character in Braille mode typing in an illustrative embodiment.
Figure 10:
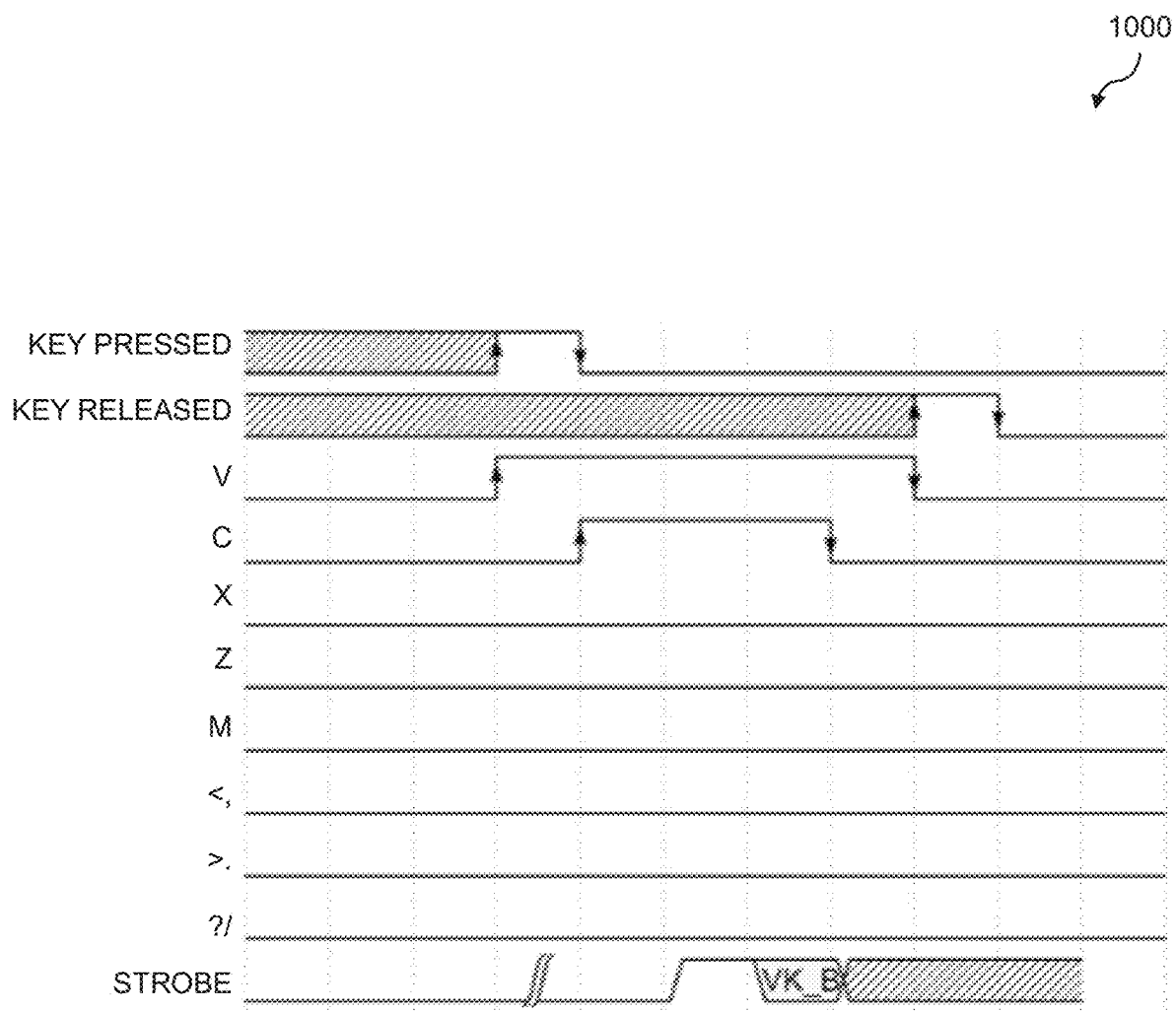
FIG. 10 shows another timing diagram for decoding key presses and releases used to input a character in Braille mode typing in an illustrative embodiment.
Figure 11:
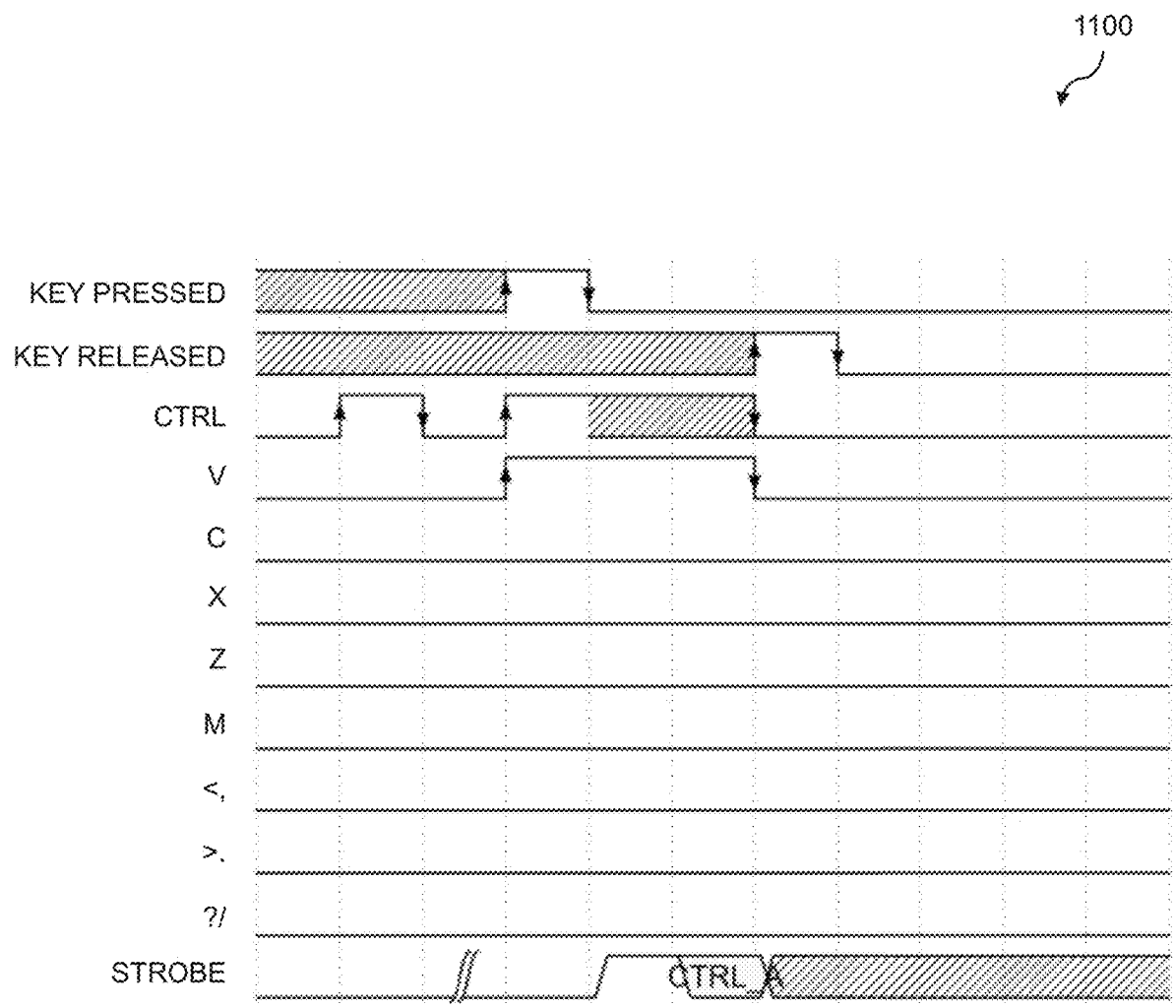
FIG. 11 shows a timing diagram for decoding key presses and releases used to input a special character combination in Braille mode typing in an illustrative embodiment.

FIGS. 9-11 show respective timing diagrams 900, 1000 and 1100 illustrating algorithms for processing key presses while Braille mode typing is activated. In the timing diagrams of FIGS. 9-11, key_pressed and key_released are events generated when keys are pressed, and strobe is a signal which happens after the last key is pressed.

The timing diagram 900 of FIG. 9 illustrates decoding of the character A, where the "V" key is pressed and released, which results in the keyboard emitting the letter scan code VK_A (e.g., the code for when the letter "A" is typed).

The timing diagram 1000 of FIG. 10 illustrates decoding of the character B, where the "V" and "C" keys are pressed and released together, which results in the keyboard emitting the letter scan code VK_B (e.g., the code for when the letter "B" is typed). As seen in the timing diagram 1000, the strobe pulse happens at a time after the last key is pressed, the key_released event happens only after the last key is released (e.g., the "V" key in the FIG. 10 example), and the key_pressed event happens only after the first key is pressed (e.g., also the "V" key in the FIG. 10 example).

The timing diagram 1100 of FIG. 11 illustrates decoding of the "CTRL-A" key combination. Since Braille keyboards are multi-key dependent, having another set of keys to be pressed together imposes a natural limitation on key combinations such as "CTRL-A". As described above, the technical solutions in some embodiments overcome this technical problem by enabling state through double typing. With such functionality, the user can input the combination of keys needed to generate the key combination code. As seen in the timing diagram 1100, two key presses of the "CTRL" key "locks" the control key, at which time the user types the letter A (e.g., by pressing the "V" key) to generate the scan code CTRL-A. After a sequence is emitted, the state is set to default. In the FIG. 11 example, the "lock" of the "CTRL" key is reset after the scan code for CTRL-A is generated.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As indicated previously, components of an information processing system as disclosed herein can be implemented at least in part in the form of one or more software programs stored in memory and executed by a processor of a processing device. For example, at least portions of the functionality for enabling a vision-impaired user typing mode on computing devices as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, computing devices, keyboards, keyboard layouts, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
    at least one processing device comprising a processor coupled to a memory;
    the at least one processing device being configured to perform steps of:
        activating a vision-impaired user typing mode responsive to detecting a designated combination of key presses of one or more of a plurality of keys of a keyboard;
        obtaining, responsive to activating the vision-impaired user typing mode, a mapping of a subset of the plurality of keys of the keyboard to respective positions of a matrix cell used in a tactile writing system; and
        decoding, in response to detecting a combination of key presses and releases of one or more of the subset of the plurality of keys of the keyboard which are mapped to the respective positions of the matrix cell used in the tactile writing system, input of one or more characters;

wherein decoding the input of one or more characters is based at least in part on detecting start and stop of a key lock of a given non-alphanumeric one of the plurality of keys of the keyboard, the key lock enabling entry of the given non-alphanumeric key in combination with one or more of the subset of the plurality of keys which are mapped to the matrix cell used in the tactile writing system, the start and stop of the key lock being detected based at least in part on one or more designated sequences of key presses of the given non-alphanumeric key.

2. The apparatus of claim 1 wherein the tactile writing system comprises a Braille writing system.

3. The apparatus of claim 1 wherein the plurality of keys of the keyboard are arranged in a QWERTY keyboard layout.

4. The apparatus of claim 3 wherein the designated combination of key presses of the plurality of keys of the keyboard comprises a combination of a function key in the QWERTY keyboard layout and at least one of an F key in the QWERTY keyboard layout and a J key in the QWERTY keyboard layout.

5. The apparatus of claim 3 wherein the subset of the plurality of keys of the keyboard mapped to respective positions of the matrix cell used in the tactile writing system comprises keys in a Z row of keys in the QWERTY keyboard layout.

6. The apparatus of claim 1 wherein the matrix cell used in the tactile writing system comprises a 3×2 matrix cell, wherein a first subset of the positions of the matrix cell are mapped to V, C and X keys in a Z row of keys in a QWERTY keyboard layout, and wherein a second subset of the positions of the matrix cell are mapped to M, comma and period keys in the Z row of keys in the QWERTY keyboard layout.

7. The apparatus of claim 1 wherein the matrix cell used in the tactile writing system comprises a 4×2 matrix cell, wherein a first subset of the positions of the matrix cell are mapped to V, C, X and Z keys in a Z row of keys in a QWERTY keyboard layout, and wherein a second subset of the positions of the matrix cell are mapped to M, comma, period and question mark keys in the Z row of keys in the QWERTY keyboard layout.

8. The apparatus of claim 1 wherein mapping the subset of the plurality of keys of the keyboard to respective positions of the matrix cell used in the tactile writing system comprises disabling one or more of the plurality of keys of the keyboard not in the subset of the plurality of keys.

9. The apparatus of claim 1 wherein the plurality of keys of the keyboard are arranged in a designated layout, and wherein mapping the subset of the plurality of keys of the keyboard to respective positions of the matrix cell used in the tactile writing system further comprises re-mapping one or more non-alphanumeric ones of the plurality of keys of the keyboard from original positions in the designated layout to new positions closer to the subset of the plurality of keys of the keyboard.

10. The apparatus of claim 1 wherein detecting the start of the key lock of the given non-alphanumeric key is in response to detecting a sequence of two key presses of the given non-alphanumeric key prior to detecting key presses of one or more of the subset of the plurality of keys of the keyboard which are mapped to the positions of the matrix cell used in the tactile writing system.

11. The apparatus of claim 1 wherein detecting the stop of the key lock of the given non-alphanumeric key is in response to at least one of:

detecting an additional key press of the given non-alphanumeric key prior to detecting key presses of one or more of the subset of the plurality of keys of the keyboard which are mapped to the positions of the matrix cell used in the tactile writing system; and decoding a key combination including the given non-alphanumeric key and one or more additional ones of the plurality of keys of the keyboard.

12. The apparatus of claim 1 wherein decoding the input of one or more characters comprises decoding a given character represented in the tactile writing system by raised features in two or more of the positions of the matrix cell responsive to detecting at least partially overlapping key presses of two or more of the subset of the plurality of keys of the keyboard which are mapped to the two or more positions of the matrix cell.

13. The apparatus of claim 1 wherein the at least one processing device is further configured to perform the step of deactivating the vision-impaired user typing mode responsive to detecting the designated combination of key presses of the plurality of keys of the keyboard.

14. The apparatus of claim 1 wherein one or more of the subset of the plurality of keys are configured with tactile features for a user to locate said one or more of the subset of the plurality of keys.

15. A computer program product comprising a non-transitory processor-readable storage medium having stored therein program code of one or more software programs, wherein the program code when executed by at least one processing device causes the at least one processing device to perform steps of:

activating a vision-impaired user typing mode responsive to detecting a designated combination of key presses of one or more of a plurality of keys of a keyboard;

obtaining, responsive to activating the vision-impaired user typing mode, a mapping of a subset of the plurality of keys of the keyboard to respective positions of a matrix cell used in a tactile writing system; and decoding, in response to detecting a combination of key presses and releases of one or more of the subset of the plurality of keys of the keyboard which are mapped to the respective positions of the matrix cell used in the tactile writing system, input of one or more characters;

wherein decoding the input of one or more characters is based at least in part on detecting start and stop of a key lock of a given non-alphanumeric one of the plurality of keys of the keyboard, the key lock enabling entry of the given non-alphanumeric key in combination with one or more of the subset of the plurality of keys which are mapped to the matrix cell used in the tactile writing system, the start and stop of the key lock being detected based at least in part on one or more designated sequences of key presses of the given non-alphanumeric key.

16. The computer program product of claim 15 wherein the plurality of keys of the keyboard are arranged in a QWERTY keyboard layout, and wherein the subset of the plurality of keys of the keyboard mapped to respective positions of the matrix cell used in the tactile writing system comprises keys in a Z row of keys in the QWERTY keyboard layout.

17. The computer program product of claim 15 wherein decoding the input of one or more characters comprises decoding a given character represented in the tactile writing system by raised features in two or more of the positions of the matrix cell responsive to detecting at least partially overlapping key presses of two or more of the subset of the plurality of keys of the keyboard which are mapped to the two or more positions of the matrix cell.

18. A method comprising steps of:

activating a vision-impaired user typing mode responsive to detecting a designated combination of key presses of one or more of a plurality of keys of a keyboard;

obtaining, responsive to activating the vision-impaired user typing mode, a mapping of a subset of the plurality of keys of the keyboard to respective positions of a matrix cell used in a tactile writing system; and decoding, in response to detecting a combination of key presses and releases of one or more of the subset of the plurality of keys of the keyboard which are mapped to the respective positions of the matrix cell used in the tactile writing system, input of one or more characters;

wherein decoding the input of one or more characters is based at least in part on detecting start and stop of a key lock of a given non-alphanumeric one of the plurality of keys of the keyboard, the key lock enabling entry of the given non-alphanumeric key in combination with one or more of the subset of the plurality of keys which are mapped to the matrix cell used in the tactile writing system, the start and stop of the key lock being detected based at least in part on one or more designated sequences of key presses of the given non-alphanumeric key; and wherein the method is performed by at least one processing device comprising a processor coupled to a memory.

19. The method of claim 18 wherein the plurality of keys of the keyboard are arranged in a QWERTY keyboard layout, and wherein the subset of the plurality of keys of the keyboard mapped to respective positions of the matrix cell used in the tactile writing system comprises keys in a Z row of keys in the QWERTY keyboard layout.

20. The method of claim 18 wherein decoding the input of one or more characters comprises decoding a given character represented in the tactile writing system by raised features in two or more of the positions of the matrix cell responsive to detecting at least partially overlapping key presses of two or more of the subset of the plurality of keys of the keyboard which are mapped to the two or more positions of the matrix cell.

* * * * *